United States Patent
Jackson et al.

(10) Patent No.: US 10,562,507 B2
(45) Date of Patent: Feb. 18, 2020

(54) WORK VEHICLE WITH REMOTE BRAKE RELEASE

(71) Applicant: CNH Industrial America, LLC, New Holland, PA (US)

(72) Inventors: Jeffrey Jackson, Burlington, IA (US); Curtis Beekman, Mediapolis, IA (US); Christopher Alan Andreuccetti, Burlington, IA (US)

(73) Assignee: CNH Industrial America LLC, New Holland, PA (US)

( * ) Notice: Subject to any disclaimer, the term of this patent is extended or adjusted under 35 U.S.C. 154(b) by 102 days.

(21) Appl. No.: 15/444,781

(22) Filed: Feb. 28, 2017

(65) Prior Publication Data
US 2018/0244252 A1     Aug. 30, 2018

(51) Int. Cl.
*B60T 15/50*        (2006.01)
*B60T 13/14*        (2006.01)
(Continued)

(52) U.S. Cl.
CPC .............. *B60T 15/50* (2013.01); *B60T 10/04* (2013.01); *B60T 13/148* (2013.01); *B60T 13/22* (2013.01);
(Continued)

(58) Field of Classification Search
CPC ...... B60T 13/148; B60T 13/22; B60T 15/028; B60T 15/50; B60T 2270/414; B62D 33/077; B60Y 2200/41; B60Y 2400/406
See application file for complete search history.

(56) References Cited

U.S. PATENT DOCUMENTS 2,430,954 A    11/1947   Schnell
2,963,117 A * 12/1960   McGill ..................... B60T 1/08
                                                     188/271
(Continued)

FOREIGN PATENT DOCUMENTS

WO     WO 2013/144543     10/2013

OTHER PUBLICATIONS

European Search Report for European Application No. 18158629.8, dated Jul. 13, 2018 (6 pages).

*Primary Examiner* — Melody M Burch
(74) *Attorney, Agent, or Firm* — Peter K. Zacharias; Patrick M. Sheldrake

(57) ABSTRACT

The present disclosure is directed to a braking system for a work vehicle having hydraulically-actuated brakes. The braking system includes a primary release valve, a secondary release valve, and at least one braking mechanism having one or more brake springs. The braking mechanism(s) is hydraulically coupled to the primary release valve and the secondary release valve via one or more hydraulic lines. As such, during full-power operation of the work vehicle, when the brakes are to be released, the primary release valve is energized so as to overcome a valve biasing spring, thereby shifting the primary release valve so as to direct pressurized hydraulic fluid to the braking mechanism(s). Further, when the brakes are to be applied, the primary release valve is inactive so as to allow the hydraulic fluid to flow away from the braking mechanism(s) to a primary reservoir such that the one or more brake springs compress the braking mechanism(s). Alternatively, when power is lost to the work vehicle, the secondary release valve bypasses the primary release valve and directs pressurized hydraulic fluid to the braking mechanism(s) to release the brakes.

16 Claims, 3 Drawing Sheets

(51) Int. Cl.
*B60T 13/22* (2006.01)
*B60T 10/04* (2006.01)
*B60T 15/02* (2006.01)
*B62D 33/077* (2006.01)

(52) U.S. Cl.
CPC .......... *B60T 15/028* (2013.01); *B62D 33/077* (2013.01); *B60T 2270/414* (2013.01); *B60Y 2200/41* (2013.01); *B60Y 2400/406* (2013.01)

(56) References Cited

U.S. PATENT DOCUMENTS

| | | | | |
|---|---|---|---|---|
| 3,981,545 A * | 9/1976 | Eddy | ................ | B60T 8/175 303/139 |
| 4,571,008 A * | 2/1986 | Wickham | ................ | B60T 15/42 303/33 |
| 4,856,622 A | 8/1989 | Sartain et al. | | |
| 5,605,384 A | 2/1997 | Johnston et al. | | |
| 5,984,425 A | 11/1999 | Orzal | | |
| 6,098,976 A * | 8/2000 | Gieser | ................ | B65H 29/52 226/195 |
| 6,290,024 B1 * | 9/2001 | Ehlert | ................ | F16N 7/32 184/6.22 |
| 6,477,836 B1 * | 11/2002 | Bianchetta | ................ | E02F 9/2225 60/422 |
| 6,550,872 B1 | 4/2003 | Caldwell | | |
| 6,675,576 B2 * | 1/2004 | Bigo | ................ | B60T 13/22 60/436 |
| 6,715,590 B2 | 4/2004 | Tabor | | |
| 8,262,173 B2 | 11/2012 | Crawford | | |
| 2007/0257553 A1 * | 11/2007 | Joyce | ................ | B60T 8/5006 303/156 |
| 2008/0142316 A1 * | 6/2008 | Rocca | ................ | B60T 13/22 188/151 A |
| 2014/0196994 A1 | 7/2014 | Schneider et al. | | |

\* cited by examiner

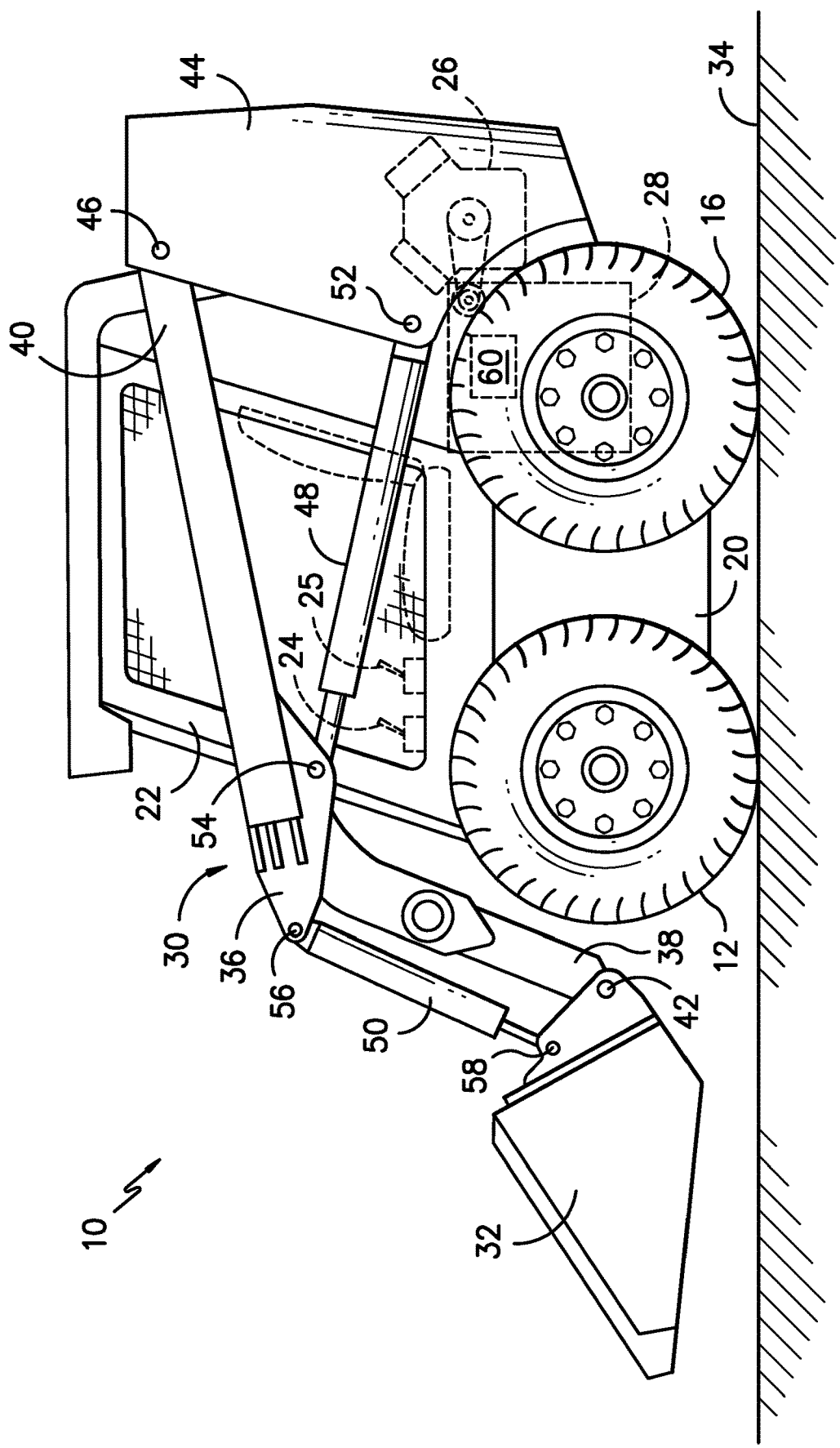
FIG. -1-

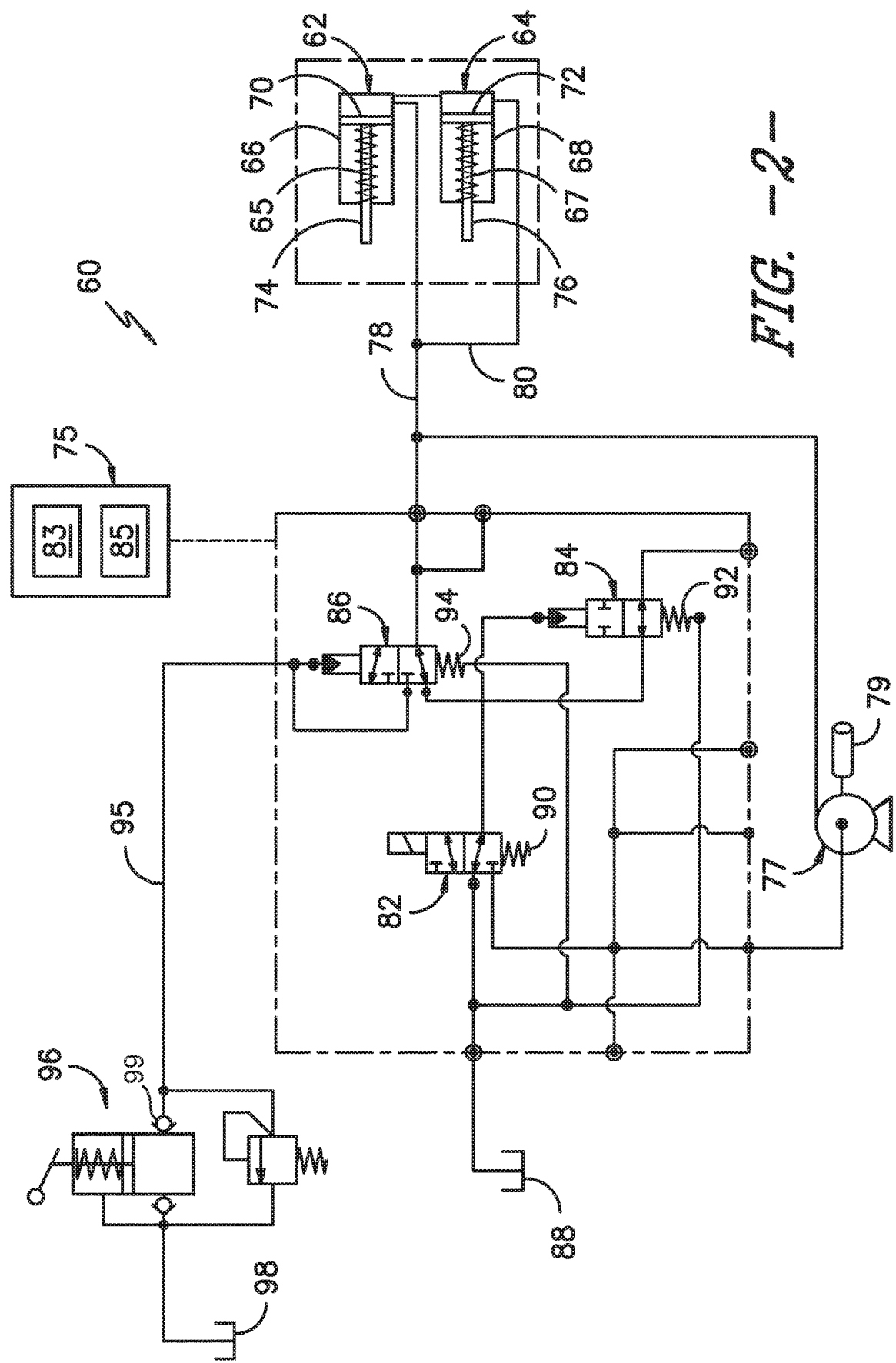
FIG. -2-

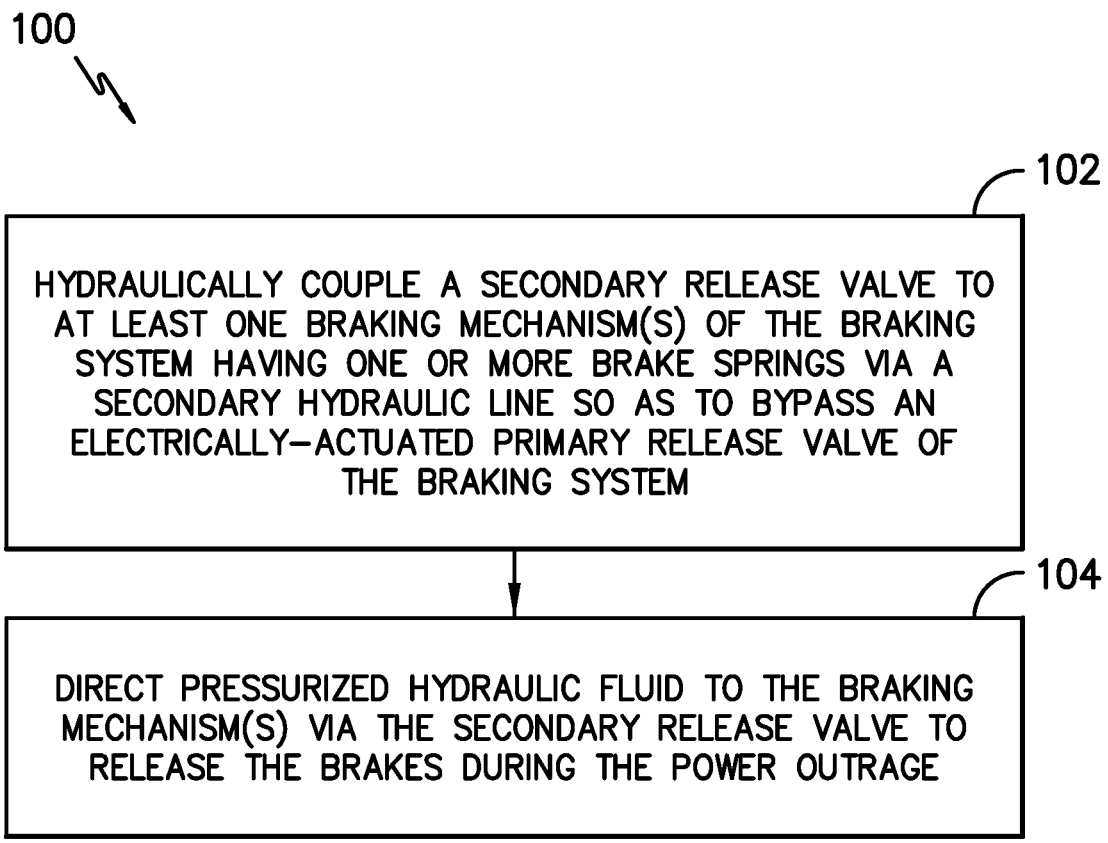
FIG. -3-

WORK VEHICLE WITH REMOTE BRAKE RELEASE

FIELD OF THE INVENTION

The present subject matter relates generally to work vehicles and, more particularly, to a system and method for remotely releasing the braking system of a work vehicle during loss of power.

BACKGROUND OF THE INVENTION

Work vehicles having loader arms, such as skid steer loaders, telescopic handlers, wheel loaders, backhoe loaders, forklifts, compact track loaders and the like, are a mainstay of construction work and industry. For example, skid steer loaders typically include a pair of loader arms pivotally coupled to the vehicle's chassis that can be raised and lowered at the operator's command. The loader arms typically have an implement attached to their end, thereby allowing the implement to be moved relative to the ground as the loader arms are raised and lowered. For example, a bucket is often coupled to the loader arm, which allows the skid steer loader to be used to carry supplies or particulate matter, such as gravel, sand, or dirt, around a worksite. Oftentimes, such work vehicles are driven by a hydrostatic drive system.

Work vehicle braking systems are often operated manually by an operator pressing one or more brake pedals. For example, certain agricultural, work, and off-road vehicles, may have two brake pedals, one brake pedal for the left brakes and another brake pedal for the right brakes. In addition, the hydrostatic drive system of the work vehicle is often used for braking. Thus, the braking system generally includes a reservoir of pressurized fluid hydraulically connected to one or more brake cylinders that is, in turn, connected to a controlling mechanism via one or more hydraulic lines. As such, the brakes are released and compressed by directing pressurized brake fluid between the controlling mechanism and the brake cylinders.

When such braking systems experience a power outage, the brakes lock up since the system can no longer supply the needed pressurized fluid to the braking cylinders. However, in order to move and/or tow the work vehicle to a safe location, the operator needs to be able to release the brakes during such power losses. One issue with releasing the brakes during power losses is that it is often difficult for an operator to access the braking system to make necessary repairs.

Accordingly, an improved system and method for remotely releasing the brakes of a work vehicle during loss of power would be welcomed in the art.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a braking system for a work vehicle having hydraulically-actuated brakes. The braking system includes a primary release valve, a secondary release valve, and at least one braking mechanism having one or more brake springs. The braking mechanism(s) is hydraulically coupled to the primary release valve and the secondary release valve via one or more hydraulic lines. As such, during full-power operation of the work vehicle, when the brakes are to be released, the primary release valve is energized so as to overcome a valve biasing spring, thereby shifting the primary release valve so as to direct pressurized hydraulic fluid to the braking mechanism(s). Further, when the brakes are to be applied, the primary release valve is inactive so as to allow the hydraulic fluid to flow away from the braking mechanism(s) to a primary reservoir such that the one or more brake springs compress the braking mechanism(s). Alternatively, when power is lost to the work vehicle, the secondary release valve bypasses the primary release valve and directs pressurized hydraulic fluid to the braking mechanism(s) to release the brakes.

In another aspect, the present subject matter is directed to a work vehicle. The work vehicle includes a pair of front wheels, a pair of rear wheels, a chassis coupled to and supported by the wheels, and a braking system having hydraulically-actuated brakes that are coupled to the front and rear wheels. The braking system includes a primary release valve, a secondary release valve, and at least one braking mechanism having one or more brake springs. The braking mechanism is hydraulically coupled to the primary release valve and the secondary release valve via one or more hydraulic lines. As such, during full-power operation of the work vehicle, when the brakes are to be released, the primary release valve is energized so as to overcome a valve biasing spring, thereby shifting the primary release valve so as to direct pressurized hydraulic fluid to the braking mechanism. Further, when the brakes are to be applied, the primary release valve is inactive so as to allow the hydraulic fluid to flow away from the braking mechanism(s) to a primary reservoir such that the one or more brake springs compress the braking mechanism(s). Alternatively, when power is lost to the work vehicle, the secondary release valve bypasses the primary release valve and directs pressurized hydraulic fluid to the braking mechanism to release the brakes.

In yet another aspect, the present subject matter is directed to a method for operating a braking system of a work vehicle having hydraulically-actuated brakes during a power outage. The method includes hydraulically coupling a secondary release valve to at least one braking mechanism of the braking system having one or more brake springs via a secondary hydraulic line. As such, the secondary hydraulic line bypasses an electrically-actuated primary release valve of the braking system. Thus, the method also includes directing pressurized hydraulic fluid via the secondary release valve to the braking mechanism to release the brakes during the power outage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle according to the present disclosure;

FIG. 2 illustrates a schematic view of one embodiment of a suitable braking system for a work vehicle according to the present disclosure; and FIG. 3 illustrates a flow diagram of one embodiment of a method for operating a braking system of a work vehicle having hydraulically-actuated brakes during a power outage according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a side view of one embodiment of a work vehicle 10 in accordance with aspects of the present subject matter. As shown, the work vehicle 10 is configured as a skid steer loader. However, in other embodiments, the work vehicle 10 may be configured as any other suitable work vehicle known in the art, such as any other vehicle including a lift assembly that allows for the maneuvering of an implement (e.g., telescopic handlers, wheel loaders, backhoe loaders, forklifts, compact track loaders, bulldozers and/or the like).

As shown, the work vehicle 10 includes a pair of front wheels 12, (one of which is shown), a pair of rear wheels 16 (one of which is shown) and a chassis 20 coupled to and supported by the wheels 12, 16. An operator's cab 22 may be supported by a portion of the chassis 20 and may house various input devices, such as one or more speed control joysticks 24 and one or more lift/tilt joysticks 25, for permitting an operator to control the operation of the work vehicle 10. In addition, the work vehicle 10 may include an engine 26 and a hydrostatic drive unit 28 coupled to or otherwise supported by the chassis 20. More specifically, the hydrostatic drive unit 28 is configured to drive a braking system 60 of the work vehicle 10, which is described in more detail below with reference to FIG. 2.

Moreover, as shown in FIG. 1, the work vehicle 10 may also include a lift assembly 30 for raising and lowering a suitable implement 32 (e.g., a bucket) relative to a driving surface 34 of the vehicle 10. In several embodiments, the lift assembly 30 may include a pair of loader arms 36 (one of which is shown) pivotally coupled between the chassis 20 and the implement 32. For example, as shown in FIG. 1, each loader arm 36 may be configured to extend lengthwise between a forward end 38 and an aft end 40, with the forward end 38 being pivotally coupled to the implement 32 at a forward pivot point 42 and the aft end 40 being pivotally coupled to the chassis 20 (or a rear tower(s) 44 coupled to or otherwise supported by the chassis 20) at a rear pivot point 46.

In addition, the lift assembly 30 may also include a pair of hydraulic lift cylinders 48 coupled between the chassis 20 (e.g., at the rear tower(s) 44) and the loader arms 36 and a pair of hydraulic tilt cylinders 50 coupled between the loader arms 36 and the implement 32. For example, as shown in the illustrated embodiment, each lift cylinder 48 may be pivotally coupled to the chassis 20 at a lift pivot point 52 and may extend outwardly therefrom so to be coupled to its corresponding loader arm 36 at an intermediate attachment location 54 defined between the forward and aft ends 38, 40 of each loader arm 36. Similarly, each tilt cylinder 50 may be coupled to its corresponding loader arm 36 at a first attachment location 56 and may extend outwardly therefrom so as to be coupled to the implement 32 at a second attachment location 58.

It should be readily understood by those of ordinary skill in the art that the lift and tilt cylinders 48, 50 may be utilized to allow the implement 32 to be raised/lowered and/or pivoted relative to the driving surface 34 of the work vehicle 10. For example, the lift cylinders 48 may be extended and retracted in order to pivot the loader arms 36 upward and downwards, respectively, about the rear pivot point 52, thereby at least partially controlling the vertical positioning of the implement 32 relative to the driving surface 34. Similarly, the tilt cylinders 50 may be extended and retracted in order to pivot the implement 32 relative to the loader arms 36 about the forward pivot point 42, thereby controlling the tilt angle or orientation of the implement 32 relative to the driving surface 34.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration.

Referring now to FIG. 2, a schematic diagram of one embodiment of the braking system 60 having hydraulically-actuated brakes is illustrated. More specifically, as shown, the braking system 60 includes a dual-path hydrostatic transmission having left and right braking mechanisms 62, 64 controlled by left and right brake pedals (not shown). As such, the braking system 60 includes two (i.e. left and right) braking circuits. More specifically, in one embodiment, the braking mechanisms 62, 64 may include one or more brake cylinders or a clutch drive system. For example, as shown, each braking mechanism 62, 64 may include an outer housing 66, 68 with a piston 70, 72 configured therein. Further, the piston 70, 72 may be surrounded by a brake spring 65, 67 that is moved via an actuating rod 74, 76 connected to respective brake pedals.

Still referring to FIG. 2, the braking system 60 further includes an electrically-actuated two-position, three-way primary release valve 82 positioned between the braking mechanism(s) 62, 64 and a reservoir 88. In addition, the braking system 60 also includes a secondary release valve 86. Further, as shown, the braking mechanisms 62, 64 are individually (i.e. independently) coupled to the primary release valve 82 and the secondary release valve 86 via one or more hydraulic lines 78, 80. In other words, the secondary release valve 86 is not hydraulically coupled to the primary release valve 82. Thus, during full-power operation of the work vehicle 10, when the brakes are to be released, the primary release valve 82 is energized so as to overcome valve biasing spring 90, thereby shifting the valve 82 and directing the pressurized hydraulic fluid from the reservoir 88 to the braking mechanism(s) 62, 64. As such, the pressurized hydraulic fluid overcomes the brake springs 65, 67 and the brakes are released as long as pressurized hydraulic fluid is supplied thereto.

For example, in one embodiment, the braking system 60 may include a control system 75 and at least one primary pumping device 77 having a pumping motor 79. In such embodiments, the primary release valve 82 is energized via the control system 75, whereas the primary pumping device 77 pressurizes the hydraulic fluid in the hydraulic lines 78,

80. For instance, the control system 75 may be configured to transmit suitable control commands to the valves 82, 84 in order to regulate the flow of hydraulic fluid supplied to the braking mechanism 62, 64, thereby allowing for control of a stroke length of the pistons 70, 72 associated with each cylinder 62, 64. To apply the brakes during full-power operation of the work vehicle 10, the primary release valve 82 remains inactive so as to allow the hydraulic fluid to flow away from the braking mechanism(s) 62, 64 to the reservoir 88 such that brake springs 65, 67 compress the braking mechanism(s) 62, 64.

If the work vehicle 10 is shut down or hydraulic pressure is lost for any reason (e.g. due to a power outage), however, the braking mechanism(s) 62, 64 will automatically be compressed because of the loss of pressurized hydraulic fluid. In other words, in the event of a power loss, the brake cylinders 62, 64 remain locked due to the loss of pressurized fluid being supplied thereto, thereby making towing of the work vehicle 10 nearly impossible. Thus, the operator needs to be able to release the brakes such that the work vehicle 10 can be easily moved or towed. As such, the secondary release valve 86 is provided to bypass the primary release valve 82 in the event of such a power outage, so as to direct pressurized hydraulic fluid to the braking mechanisms 62, 64 and release the brakes.

In addition, as shown, the braking system 60 may also include a secondary pumping device 96 hydraulically coupled with the secondary release valve 86 via a secondary hydraulic line 95. As such, when power is lost, the secondary pumping device 96 pressurizes the hydraulic fluid that is directed to the braking mechanisms 62, 64. In certain embodiments, for example, the secondary pumping device 96 may include a manually-operated pumping device (i.e. a hand pump), an electrical pumping device, and/or a hydraulic pumping device configured with a secondary reservoir 98. In one embodiment, the secondary pumping device 96 may be remotely-controlled by the operator. As such, the operator can easily pressurize the hydraulic fluid without needing access to the braking system 60. Additionally, as shown in FIG. 2, a check valve, such as check valve 99, is hydraulically coupled to the secondary hydraulic line 95 between the secondary pumping device 96 and the secondary release valve 86.

Still referring to FIG. 2, the braking system 60 may also include a safety valve 84 hydraulically coupled between the primary release valve 82 and the braking mechanisms 62, 64. Thus, in certain embodiments, the safety valve 84 is configured to drain the braking system 60 to ensure that the braking system 60 returns to a neutral state and the primary pumping device 77 does not send hydraulic fluid to the pumping motor 79. In addition, as shown in the illustrated embodiment, the primary reservoir 88 may be hydraulically coupled to the primary release valve 82 and the safety valve 84, but not the secondary release valve 86. As such, the secondary release valve 86 and the secondary reservoir 98 provide an independent pressurizing system for the braking mechanisms 62, 64 that bypasses the primary system in the event of a power loss.

It should be understood that the primary release valve 82, the secondary release valve 86, and/or the safety valve 84 may include any suitable valves, such as, for example, solenoid valves. More specifically, in particular embodiments, the primary release valve 82 and the secondary release valve 86 may include two-position, three-way solenoid valves, whereas the safety valve 84 may include a two-position, two-way solenoid valve. Alternatively, the safety valve 84 may include a two-position, four-way solenoid valve. In further embodiments, as shown, the primary release valve 82 may include an electrically-actuated valve, whereas the secondary release valve 86 and/or the safety valve 84 may include a pilot-actuated valve.

In addition, it should be understood that the control system 75 as described herein may be configured to electronically control the operation of one or more components of the work vehicle 10, such as the various hydraulic components of the work vehicle 10 (e.g., the braking mechanism 62, 64 and valves 82, 84, 86). In general, the control system 75 may comprise any suitable processor-based device known in the art, such as a computing device or any suitable combination of computing devices. Thus, in several embodiments, the control system 75 may include one or more processor(s) 83 and associated memory device(s) 85 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits.

Additionally, the memory device(s) 85 of the control system 75 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 85 may generally be configured to store suitable computer-readable instructions that, when implemented by the processor(s) 83, configure the control system 75 to perform various computer-implemented functions. In addition, the control system 75 may also include various other suitable components, such as a communications circuit or module, one or more input/output channels, a data/control bus and/or the like.

In addition, it should be appreciated that the control system 75 may correspond to an existing controller of the work vehicle 10 or the control system 75 may correspond to a separate processing device. For instance, in one embodiment, the control system 75 may form all or part of a separate plug-in module that may be installed within the work vehicle 10 to allow for the disclosed system and method to be implemented without requiring additional software to be uploaded onto existing control devices of the vehicle 10.

Referring now to FIG. 3, a flow diagram of one embodiment of a method 100 for operating a braking system 60 of a work vehicle 10 having hydraulically-actuated brakes during a power outage is illustrated. For example, as shown at 102, the method 100 includes hydraulically coupling a secondary release valve 86 to at least one braking mechanism(s) 62, 64 of the braking system 60 having one or more brake springs 65, 67 via a secondary hydraulic line (e.g. lines 78, 80). As such, the secondary hydraulic line 78, 80 bypasses an electrically-actuated primary release valve 82 of the braking system 60. Thus, as shown at 104, the method 100 also includes directing pressurized hydraulic fluid via the secondary release valve 86 to the braking mechanism(s) 62, 64 to release the brakes during the power outage.

In one embodiment, the method 100 further includes pressurizing the hydraulic fluid via a secondary pumping device 96 hydraulically coupled with the secondary release valve 86. In another embodiment, the method 100 includes controlling the secondary pumping device remotely.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A braking system for a work vehicle having hydraulically-actuated brakes, the braking system comprising:
    a primary release valve;
    a secondary release valve;
    a braking mechanism comprising one or more brake springs, the braking mechanism hydraulically coupled to the primary release valve and the secondary release valve via one or more hydraulic lines;
    a primary pumping device hydraulically coupled to the one or more hydraulic lines;
    a secondary pumping device hydraulically coupled to the secondary release valve via a separate hydraulic line; and
    a check valve hydraulically coupled between the secondary release valve and the secondary pumping device;
    wherein, during full-power operation of the work vehicle, the primary release valve is actuated to a first position to allow pressurized hydraulic fluid to be supplied from the primary pumping device to the braking mechanism to release the braking mechanism, and wherein, when the brakes are to be applied, the primary release valve is actuated to a second position to allow the hydraulic fluid to flow away from the braking mechanism to a primary reservoir such that the one or more brake springs compress the braking mechanism,
    wherein, when power is lost to the work vehicle, the secondary pumping device is configured to supply pressurized hydraulic fluid from a secondary reservoir to the secondary release valve via the separate hydraulic line such that the pressurized hydraulic fluid flows through the secondary release valve and is directed to the braking mechanism to release the braking mechanism, and
    wherein the secondary reservoir is separate from and independent of the primary reservoir.

2. The braking system of claim 1, wherein the braking mechanism comprises at least one of a brake cylinder or a clutch drive system.

3. The braking system of claim 1, wherein the braking mechanism comprises one of a right braking mechanism or a left braking mechanism.

4. The braking system of claim 1, further comprising a control system configured to electrically actuate the primary release valve to the first position.

5. The braking system of claim 1, further comprising a safety valve hydraulically coupled between the primary release valve and the braking mechanism, the safety valve configured to drain the braking system to ensure that the braking system returns to a neutral state and the primary pumping device does not send the hydraulic fluid to a pumping motor of the primary pumping device.

6. The braking system of claim 1, wherein e secondary pumping device is remotely-controlled.

7. The braking system of claim 1, wherein the primary release valve and the secondary release valve comprise two-position, three-way solenoid valves.

8. The braking system of claim 5, wherein the safety valve comprises at least one of a two-position; two-way solenoid valve or a two-position; four-way solenoid valve.

9. The braking system of claim 5, wherein the primary release valve comprises an electrically-actuated valve, and wherein, the secondary release valve and the safety valve comprise pilot-actuated valves.

10. A work vehicle, comprising:
    a pair of front wheels;
    a pair of rear wheels;
    a chassis coupled to and supported by the wheels; and
    a braking system having at least one hydraulically-actuated brake coupled to at least one of the front wheels or the rear wheels, the braking system comprising:
        a primary release valve;
        a secondary release valve;
        a braking mechanism comprising one or more brake springs, the braking mechanism hydraulically coupled to the primary release valve and the secondary release valve via one or more hydraulic lines;
        a primary pumping device hydraulically coupled to the one or more hydraulic lines;
        a secondary pumping device hydraulically coupled to the secondary release valve via a separate hydraulic line; and
        a check valve hydraulically coupled between the secondary release valve and the secondary pumping device;
    wherein, during full-power operation of the work vehicle, the primary release valve is actuated a first position to allow pressurized hydraulic fluid to be supplied from the primary pumping device to the braking mechanism to release the braking mechanism, and wherein, when the brakes are to be applied, the primary release valve is actuated to a second position to allow the hydraulic fluid to flow away from the braking mechanism to a primary reservoir such that the one or more brake springs compress the braking mechanism,
    wherein, when power is lost to the work vehicle, the secondary pumping device is configured to supply pressurized hydraulic fluid from a secondary reservoir to the secondary release valve via the separate hydraulic line such that the pressurized hydraulic fluid flows through the secondary release valve and is directed to the braking mechanism to release the braking mechanism,
    wherein the secondary reservoir is separate from and independent of the primary reservoir, and
    wherein the secondary release valve comprises a pilot-actuated valve and the pressurized hydraulic fluid supplied from the secondary pumping device provides a pilot pressure to actuate the secondary release valve to a position that allows the pressurized hydraulic fluid to flow through the secondary release valve to the braking mechanism.

11. A method for operating a braking system of a work vehicle having hydraulically-actuated brakes during a power outage, the braking system including a braking mechanism, an electrically-actuated primary release valve, and a primary pumping device configured to supply pressurised hydraulic fluid to the braking mechanism, the electrically-actuated primary release valve configured to be actuated to both a first position to allow pressurized hydraulic fluid to be supplied from the primary pumping device to the braking mechanism to release the braking mechanism and a second position to allow the hydraulic fluid to flow away from the braking mechanism to a primary reservoir such that the braking mechanism is engaged, the method comprising:

hydraulically coupling a secondary release valve of the braking system to a secondary pumping device of the braking system via a hydraulic line that bypasses the electrically-actuated primary release valve of the braking system; and operating the secondary pumping device to supply pressurized hydraulic fluid from a secondary reservoir to the secondary release valve via the hydraulic line such that the pressurized hydraulic fluid flows through the secondary release valve and is directed to the braking mechanism to release the braking mechanism during the power outage, wherein the secondary reservoir is separate from and independent of the primary reservoir, and wherein a check valve is hydraulically coupled between the secondary release valve and the secondary pumping device.

12. The method of claim 11, wherein the secondary pumping device comprises at least one of a manually-operated pumping device, an electrical pumping device, or a hydraulic pumping device.

13. The method of claim 11, further comprising controlling the operation of the secondary pumping device remotely.

14. The method of claim 11, wherein the electrically-actuated primary release valve and the secondary release valve comprise two-position, three-way solenoid valves.

15. The braking system of claim 1, wherein the secondary pumping device comprises at least one of a manually-operated pumping device, an electrical pumping device, or a hydraulic pumping device.

16. The work vehicle of claim 10, wherein the secondary pumping device comprises at least one of a manually-operated pumping device, an electrical pumping device, or a hydraulic pumping device.

* * * * *